Patented Apr. 3, 1934

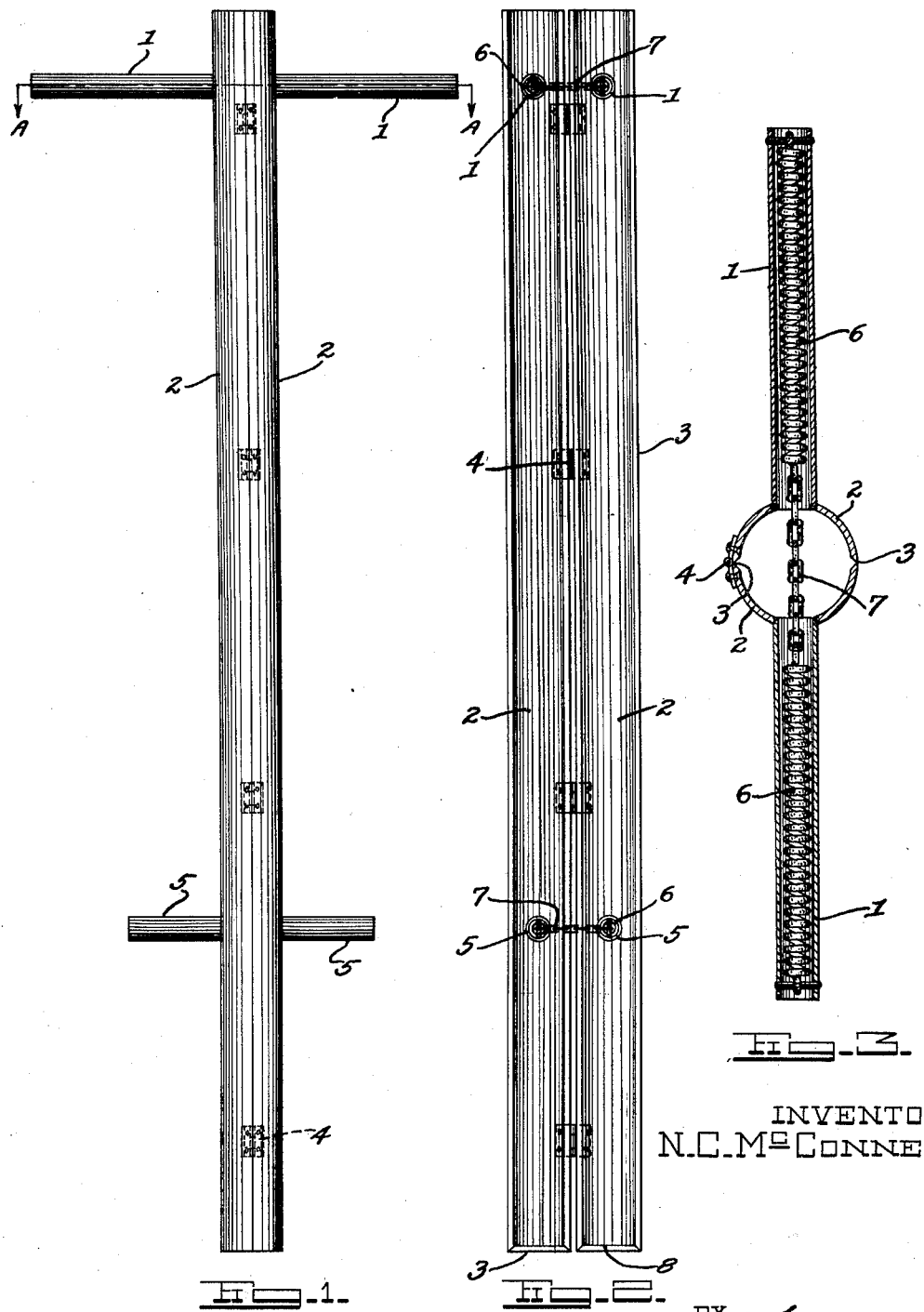

1,953,886

UNITED STATES PATENT OFFICE 1,953,886

TURPENTINE GUM SAMPLER

Nealy C. McConnell, Olustee, Fla.

Application October 27, 1933, Serial No. 695,431

2 Claims. (Cl. 137—18)

(Granted under the act of March 3, 1883, as amended April 30, 1928; 370 O. G. 757)

This application is made under the act of March 3, 1883, as amended by the act of April 30, 1928, and the invention herein described and claimed may be manufactured and used by or for the Government for governmental purposes without payment to me of any royalty thereon.

In taking samples of gum distilled it has been found that the top of the barrels do not give a true sample of the gum that went into the still. The bottom of the dip barrels often shows sand and scrape that are not seen on the top.

The object of my invention is to enable the operator to take a sample of the entire contents of the container.

Referring to the drawing, Fig. 1 is a front elevation, with my sampler closed. Fig. 2 is a side elevation, with my sampler open, and Fig. 3 is a horizontal cross-section through the line A—A.

Similar numerals refer to similar parts throughout the several views.

By referring to the drawing, it will be seen that handles and upper coil spring housing 1 are mounted on complementary barrel halves 2, having knife edges 3 formed thereon. Hinges 4 are fastened to complementary barrel halves 2, by any conventional means, and are mounted at equal intervals apart. Lower coil spring housing 5 is mounted on complementary barrel halves 2. Upper coil spring housing 1 and lower coil spring housing 5 retain coil spring 6, to which is connected link chain 7. Barrel halves 2 have complementary half bottoms 8, with knife edges 3 formed thereon. Handles and upper coil spring housing 1 should be at least 6 inches from the top of complementary barrel halves 2.

I recommend that the total length of my device should be at least 40 inches, so that it will protrude at least 8 inches above the gum, when in the barrel.

In the use of my device the operator stands to the side of the barrel to be sampled and introduces my device closed, into the barrel, until the lower end of the device rests upon the bottom head of the barrel. The operator then opens and closes my device as many times as necessary to cut with the knife edges any obstruction, such as bark and chips, and to insure that the device is closed throughout its entire length and will not permit the sample it contains to leak out. My device when thus closed contains a sample from the entire depth of the gum in the barrel. After my device has the sample contained therein, and while still closed, it is withdrawn from the barrel. When my device is withdrawn with the sample of gum from the entire barrel, it is opened over a drip pan. When in such a position it will be found that the dirt is at the bottom, the scrape immediately above it and mixed with it, and that the gum with the chips in it reaches to the top of the barrel, if the barrel is full. The sample of gum in the drip pan settles as it does in the barrel, showing the gum on top; scrape, dirt and sand, if any, at the bottom; the chips and water at the top.

In the construction of my device I have found that the material for the gum sampler may be made of straight tubing, either of wood, glass, metal, alloy, ceramics, paper or combination of any other material that is resistant to turpentine gum. The shape of my device may be round, rectangular, oblong, triangular, oval or any other generalized shape. The size of my device is to be of such volume as to pick up gum, scrape, chips, bark, sand, or any other foreign material likely to be found in a container of gum. The length is to be such as to extend from the top to the bottom of the gum container, whatever it may be. In the fabrication of my device I have found that it may be fabricated by nailing, screwing, welding, brazing, soldering, casting, forging, boring, blowing, moulding, compressing, or other methods of manufacture.

Having thus described my invention, what I claim for Letters Patent is:

1. A turpentine gum sampler, comprising a pair of substantially semi-cylindrical oblong sections hingedly connected and each having a semi-circular bottom closure, handles affixed to each said section, coil springs connected within said handles, and connected coil springs and housings therefor at the opposite end from said handles and mounted on said sections, said sections opposite the hinged portions and the semi-circular bottom closures having cutting edges.

2. A device of the character described, comprising a pair of substantially semi-cylindrical sections hingedly connected, housings secured to said sections, connected coil springs within said housings, and said semi-cylindrical sections having knife edges.

NEALY C. McCONNELL.